(12) United States Patent
Crawford et al.

(10) Patent No.: US 10,489,081 B2
(45) Date of Patent: Nov. 26, 2019

(54) REDUCING COORDINATION TIMES IN ASYNCHRONOUS DATA REPLICATION ENVIRONMENTS

(71) Applicant: International Business Machines Corporation, Armonk, NY (US)

(72) Inventors: Joshua J. Crawford, Tucson, AZ (US); Gregory E. McBride, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 15/842,893

(22) Filed: Dec. 15, 2017

(65) Prior Publication Data

US 2019/0187906 A1    Jun. 20, 2019

(51) Int. Cl.
*G06F 3/06* (2006.01)

(52) U.S. Cl.
CPC ............ *G06F 3/065* (2013.01); *G06F 3/0604* (2013.01); *G06F 3/0683* (2013.01)

(58) Field of Classification Search
CPC ....... G06F 3/065; G06F 3/0604; G06F 3/0683
See application file for complete search history.

(56) References Cited

U.S. PATENT DOCUMENTS

| | | | |
|---|---|---|---|
| 6,484,187 B1 | 11/2002 | Kern et al. | |
| 8,290,899 B2 | 10/2012 | Webman et al. | |
| 8,788,771 B2 | 7/2014 | Takahashi et al. | |
| 9,372,908 B2 | 6/2016 | Benhase et al. | |
| 9,405,481 B1 | 8/2016 | Cohen et al. | |
| 9,471,222 B2 | 10/2016 | Browne et al. | |
| 9,665,435 B2 | 5/2017 | Fujita et al. | |
| 2007/0233981 A1* | 10/2007 | Arakawa | G06F 11/2064 711/162 |
| 2008/0016300 A1* | 1/2008 | Yim | G06F 11/2064 711/162 |
| 2009/0313311 A1* | 12/2009 | Hoffmann | G06F 11/2094 |

(Continued)

OTHER PUBLICATIONS

Janssens, Michel, "EMC Symmetrix V-Max in System z Environments", 2009.

(Continued)

*Primary Examiner* — Hiep T Nguyen
(74) *Attorney, Agent, or Firm* — Nelson and Nelson; Daniel P. Nelson; Alexis V. Nelson (57) ABSTRACT

A method for reducing coordination times in asynchronous data replication environments is disclosed. In one embodiment, such a method includes providing multiple primary storage devices in an asynchronous data replication environment. A command is issued, to each of the primary storage devices, to begin queuing I/O in order to coordinate a consistency group. Each primary storage device receives the command. The method further calculates, for each of the primary storage devices, an amount of time to wait before executing the command with the objective that each primary storage device executes the command at substantially the same time. Each primary storage device is configured to execute the command after receiving and waiting its corresponding amount of time. A corresponding system and computer program product are also disclosed herein.

20 Claims, 7 Drawing Sheets

(56) References Cited

U.S. PATENT DOCUMENTS

| | | | |
|---|---|---|---|
| 2011/0172956 A1* | 7/2011 | Nakadai | H04L 45/02 |
| | | | 702/158 |
| 2014/0108345 A1 | 4/2014 | Brown et al. | |
| 2015/0237133 A1 | 8/2015 | Clayton et al. | |
| 2016/0371158 A1 | 12/2016 | Jayachandran et al. | |
| 2017/0123700 A1 | 5/2017 | Sinha et al. | |
| 2017/0161190 A1 | 6/2017 | Crawford et al. | |
| 2017/0185326 A1* | 6/2017 | Meiri | G06F 3/0619 |

OTHER PUBLICATIONS

Quinn, Brett, et al., "Local and Remote Replication Solutions From IBM, EMC, and HDS", Share in Pittsburgh, Aug. 6, 2014.
Burger, Charlie, "Global Copy, Metro Mirror, Global Mirror, and Metro/Global Mirror Overview", IBM Systems and Technology Group, 2004.
Clayton, Nick; "Global Mirror Whitepaper", IBM, European Storage Competence Centre, Sep. 2008.

* cited by examiner

REDUCING COORDINATION TIMES IN ASYNCHRONOUS DATA REPLICATION ENVIRONMENTS

BACKGROUND

Field of the Invention

This invention relates to systems and methods for reducing coordination times in asynchronous data replication environments.

Background of the Invention

In asynchronous data replication environments such as IBM's Global Mirror, data is asynchronously mirrored from a primary storage device to a secondary storage device to maintain two consistent copies of the data. The primary and secondary storage devices may be located at different sites, perhaps hundreds or even thousands of miles away from one another. In the event an outage occurs at the primary site, I/O may be redirected to the secondary storage device, thereby enabling continuous operations. This process may be referred to as a "failover." When the outage is corrected or repaired at the primary site, I/O may be redirected back to the primary storage device. This process may be referred to as a "failback."

In certain Global Mirror architectures, multiple primary storage devices may be provided at one or more primary sites. In such cases, a consistency group may be spread across multiple primary storage devices. In Global Mirror architectures, one or more controlling functions, known as "masters," may run on a primary storage device. Each master may control the creation of a consistency group and manage the replication of the consistency group across storage devices. Each master may communicate with one or more "subordinates" in other primary storage devices. In Global Mirror architectures, a "subordinate" is a function inside a primary storage device that is controlled by a master.

Asynchronous data replication environments such as Global Mirror may be configured to minimize impacts on host I/O response times. As of the latest code levels, Global Mirror has only one phase that impacts host I/O response times. This phase relates to the coordination of consistency groups (also called Start Increment or "drawing the line in the sand"). When coordinating a consistency group, each primary storage device will queue host I/O upon receiving a Start Increment command from the master and resume I/O upon receiving a Run command from the master. This ensures the consistency of writes in a consistency group. The duration of this process depends on various factors, such as the distance between primary storage devices and the performance of the primary storage devices.

Today, primary storage devices are generally at the same site (so distance between them is nearly zero) and coordination can be done in roughly 1-2 ms with regular workloads. If Global Mirror is forming a consistency group every second, a host system will see a 1-2 ms impact every second. If primary storage devices are further away from one another (as might be the case in an active/active Global Mirror configuration with the same consistency point), then distance becomes the primary factor in determining coordination times. For example, in an active/active Global Mirror configuration where primary storage devices are located approximately 5000 km from one another, the host system will see 50 ms of delay every consistency group, which is typically not acceptable.

In view of the foregoing, what are needed are systems and methods for reducing coordination times in asynchronous data replication environments, particularly in environments where primary storage devices are located significant distances from one another.

SUMMARY

The invention has been developed in response to the present state of the art and, in particular, in response to the problems and needs in the art that have not yet been fully solved by currently available systems and methods. Accordingly, the invention has been developed to provide systems and methods for reducing consistency group coordination times in asynchronous data replication environments. The features and advantages of the invention will become more fully apparent from the following description and appended claims, or may be learned by practice of the invention as set forth hereinafter.

Consistent with the foregoing, a method for reducing coordination times in asynchronous data replication environments is disclosed. In one embodiment, such a method includes providing multiple primary storage devices in an asynchronous data replication environment. A command is issued, to each of the primary storage devices, to begin queuing I/O in order to coordinate a consistency group. Each primary storage device receives the command. The method further calculates, for each of the primary storage devices, an amount of time to wait before executing the command with the objective that each primary storage device executes the command at substantially the same time. Each primary storage device is configured to execute the command after receiving and waiting its corresponding amount of time.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
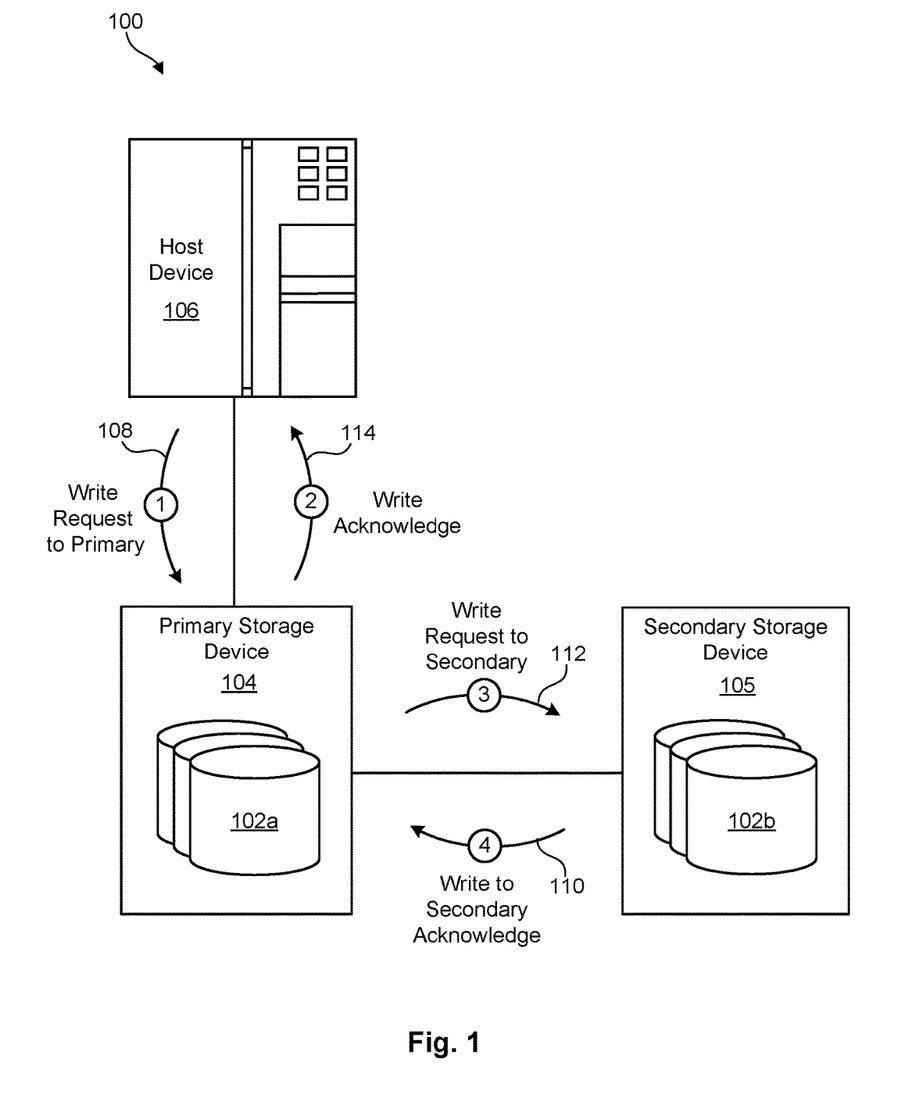
FIG. 1 is a high-level block diagram showing one example of an asynchronous data replication system.

Referring to FIG. 1, one embodiment of an asynchronous data replication system 100 is shown. The asynchronous data replication system 100 is presented to show one example of an environment in which a priority-based method may operate and is not intended to be limiting. In general, the asynchronous data replication system 100 may be used to establish a mirroring relationship between one or more storage areas 102a (e.g., volumes or groups of volumes) on a primary storage device 104 and one or more storage areas 102b (e.g., volumes or groups of volumes) on a secondary storage device 105. The primary and secondary storage devices 104, 105 may be located a significant distance from one another (e.g., on the order of hundreds or thousands or miles apart) although this is not always necessary. Channel extension equipment may be located between the storage devices 104, 105, as needed, to extend the distance over which the storage devices 104, 105 may communicate.

As mentioned herein, the data replication system 100 may be configured to operate in an asynchronous manner, meaning that a write acknowledgment may be sent to a host device 106 when data is written to a local storage device 104 without waiting for the data to be replicated to a remote storage device 105. The data may be transmitted and written to the remote storage device 105 as time and resources allow.

For example, in such a configuration a host device 106 may initially send a write request 108 to the primary storage device 104. This write operation 108 may be performed on the primary storage device 104 and the primary storage device 104 may then send an acknowledgement 114 to the host device 106 indicating that the write completed successfully. As time and bandwidth allow, the primary storage device 104 may then transmit a write request 112 to the secondary storage device 105 to replicate the data thereto. The secondary storage device 105 may execute the write operation 112 and return a write acknowledgement 110 to the primary storage device 104 indicating that the write completed successfully on the secondary storage device 105. Thus, in an asynchronous data replication system 100, the write only needs to be performed on the primary storage device 104 before an acknowledgement 114 is sent to the host 106.

Figure 2:
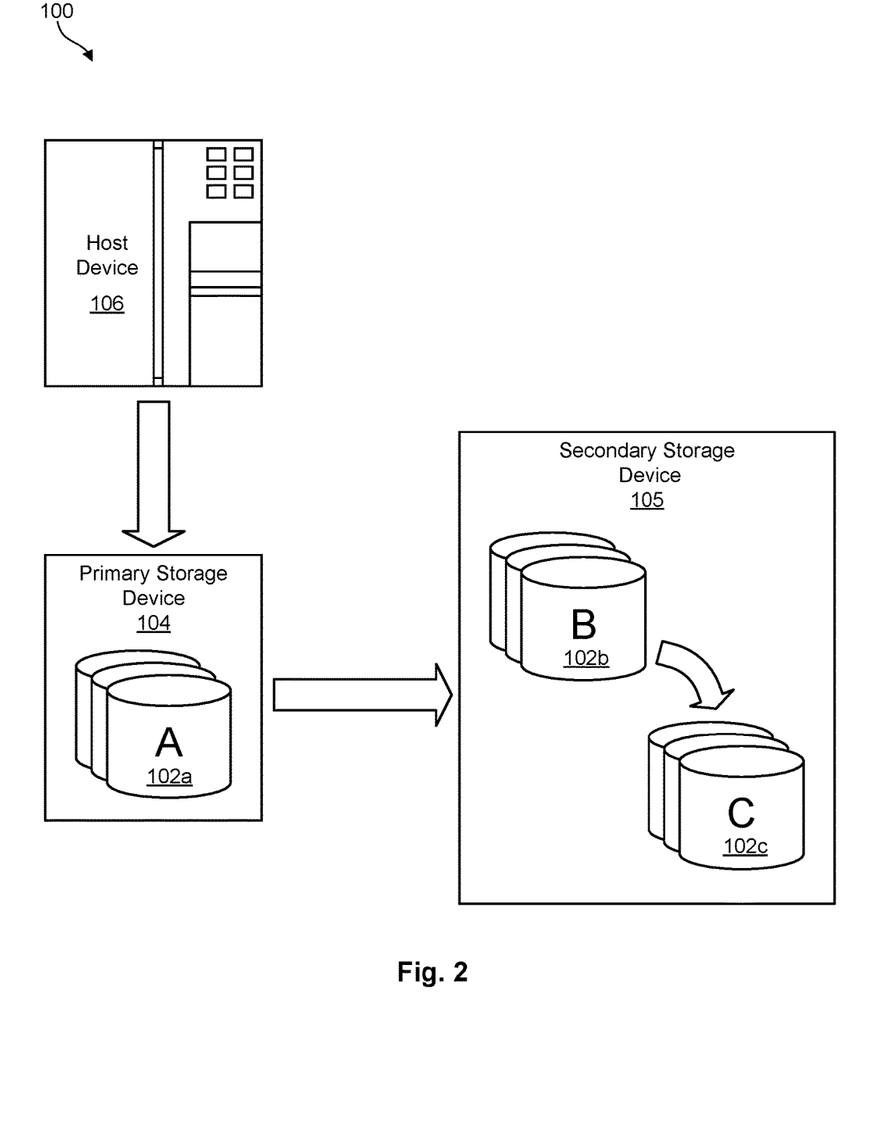
FIG. 2 is a high-level block diagram showing one example of an asynchronous data replication system comprising a single primary storage device and a single secondary storage device.

Referring to FIG. 2, a more particular embodiment of an asynchronous data replication system 100 is illustrated. The data replication system 100 illustrated in FIG. 2 is intended to describe the function of IBM's Global Mirror (Asynchronous PPRC) data replication system 100. Nevertheless, the apparatus and methods discussed herein are not limited to IBM's Global Mirror data replication system 100, but may be applicable to a variety of different asynchronous data replication systems 100 whether produced by IBM or other vendors.

In Global Mirror architectures, volumes 102a are grouped into a consistent session (also referred to as a "consistency group") at the primary storage device 104. This consistency group is replicated to a secondary storage device 105. This will create a consistent copy 102b of the volumes 102a on the secondary storage device 105. Once the consistent copy 102b is generated, the primary storage device 104 may issue a command to the secondary storage device 105 to save the consistent copy 102b. This may be accomplished by generating a point-in-time copy 102c of the consistent copy 102b using a feature such as IBM's FlashCopy.

Figure 3:
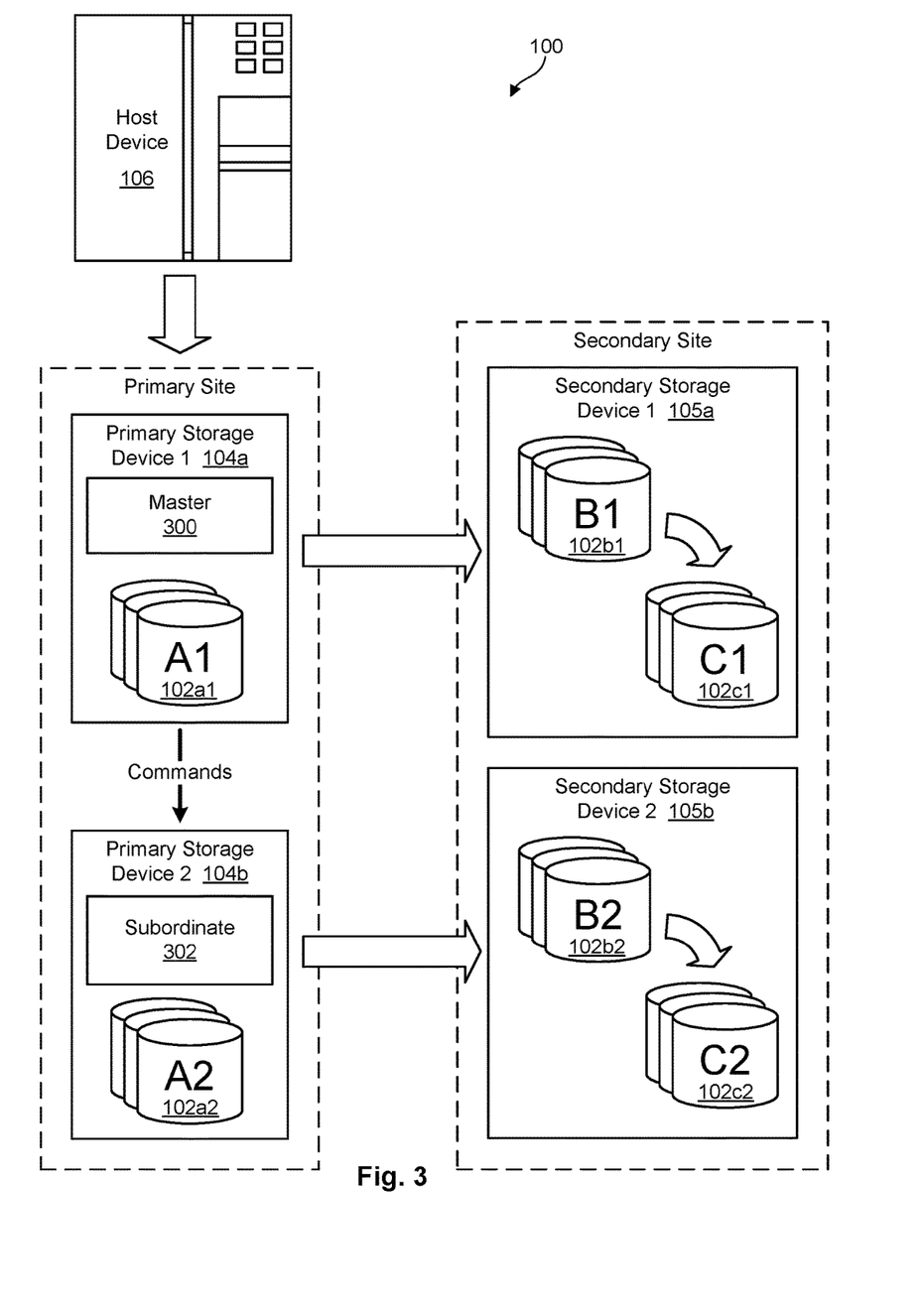
FIG. 3 is a high-level block diagram showing one example of an asynchronous data replication system comprising multiple primary storage devices and multiple secondary storage devices.

Referring to FIG. 3, in certain Global Mirror architectures, multiple primary storage devices 104a, 104b may be provided at a primary site. In such cases, a consistency group 102a1, 102a2 may be spread across multiple primary storage devices 104a, 104b. In Global Mirror architectures, one or more controlling functions, known as "masters," may run on a primary storage device 104a. Each master 300 may control the creation of a consistency group and manage the replication of the consistency group across storage devices 104a, 104b, 105a, 105b. Each master may communicate with one or more "subordinates" in other primary storage devices 104b. In Global Mirror architectures, a "subordinate" 302 is a function inside a primary storage device 104b that is controlled by a master 300.

For example, when replicating a consistency group 102a1, 102a2 on one or more primary storage devices 104a, 104b to one or more secondary storage devices 105a, 105b, the master 300 associated with the consistency group 102a1, 102a2 controls the subordinate 302. That is, the master 300 controls the replication of the local volumes 102a1 to the secondary storage device 105a, as well as issues commands to subordinates 302 on other primary storage devices 104b, thereby instructing the subordinates 302 to replicate volumes 102a2 to one or more secondary storage devices 105b. The master 300 may also issue commands to the secondary storage device 105a to generate a point-in-time copy 102c1 of the replicated copy 102b1, using a feature such as FlashCopy. Similarly, the master 300 sends commands to subordinates 302 instructing the subordinates 302 to issue point-in-time copy commands (e.g., FlashCopy commands) to their respective secondary storage devices 105b. This will cause the secondary storage devices 105b to generate point-in-time copies 102c2 of their replicated copies 102b2. In this way, a master 300 is able to control the replication of a consistency group 102a1, 102a2 from multiple primary storage devices 104a, 104b to multiple secondary storage devices 105a, 105b.

Figure 4:
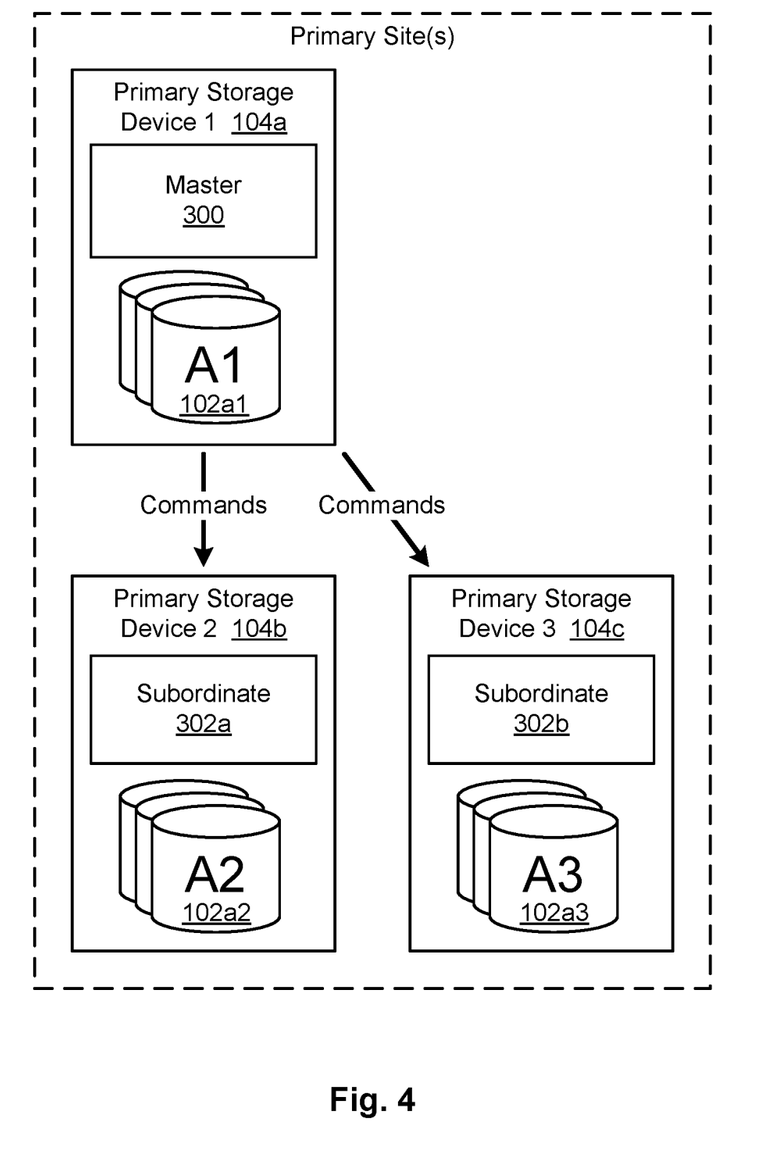
FIG. 4 is a high-level block diagram showing multiple primary storage devices having "master" and "subordinate" relationships, potentially at different geographical locations.

Referring to FIG. 4, as previously mentioned, asynchronous data replication environments such as Global Mirror may be configured to minimize impacts on host I/O response times. As of the latest code levels, Global Mirror has only one phase that impacts host I/O response times. This phase relates to the coordination of consistency groups (also called Start Increment or "drawing the line in the sand"). When coordinating a consistency group, each primary storage device 104 will queue host I/O upon receiving a Start Increment command from the master 300 and resume I/O upon receiving a Run command from the master 300. This ensures the consistency of writes in a consistency group. The duration of this process depends on various factors, such as the distance (or network path length) between primary storage devices 104 and the performance of the primary storage devices 104.

In many cases, primary storage devices 104 are at the same site (so distance between them is nearly zero) and coordination can be done in roughly 1-2 ms with regular workloads. If Global Mirror is forming a consistency group every second, a host system 106 will see a 1-2 ms impact every second. If primary storage devices 104 are further away from one another (as might be the case in an active/active Global Mirror configuration with the same consistency point), then distance becomes the primary factor in determining coordination time. For example, in an active/active Global Mirror configuration where primary storage devices 104 are located approximately 5000 km from one another, a host system 106 may see 50 ms of delay every consistency group, which is typically unacceptable.

For example, as shown in FIG. 4, assume that a first subordinate primary storage device 104b is located very close to (e.g., at the same site as) a master primary storage device 104a, and a second subordinate primary storage device 104c is located a significant distance from (e.g., 5000 km) the master primary storage device 104a. Further assume that the master primary storage device 104a, as part of coordinating a consistency group, sends a Start Increment command to each of the subordinate primary storage devices 104b, 104c (including the master primary storage device 104a itself, which also acts as a subordinate 302), instructing them to queue host I/O (i.e., cease to process host I/O). Because the subordinate primary storage device 104c is located further away from the master primary storage device 104a than the subordinate primary storage device 104b, the subordinate primary storage device 104c will receive the command some time after the subordinate primary storage device 104b due to network latency. This will cause the closer subordinate primary storage device 104b to begin queuing host I/O before the more remote subordinate primary storage device 104c. Only after each primary storage device 104a-c begins queuing host I/O and notifies the master primary storage device 104a of such, can a consistency group be formed. Once the consistency group is formed, the master primary storage device 104a may issue a Run command to the subordinate primary storage devices 104a-c that instructs them to resume processing host I/O.

Because the subordinate primary storage devices 104b, 104c begin queuing I/O at different times as a result of their differing distances from the master primary storage device 104a, this increases the time needed to form a consistency group. This also undesirably extends the amount of time that host I/O cannot be processed. As a result, systems and methods are needed to reduce coordination times in asynchronous data replication environments, particularly in environments where primary storage devices 104a-c are located significant distances from one another. Such systems and methods are disclosed herein in association with FIGS. 5 through 7.

Figure 5:
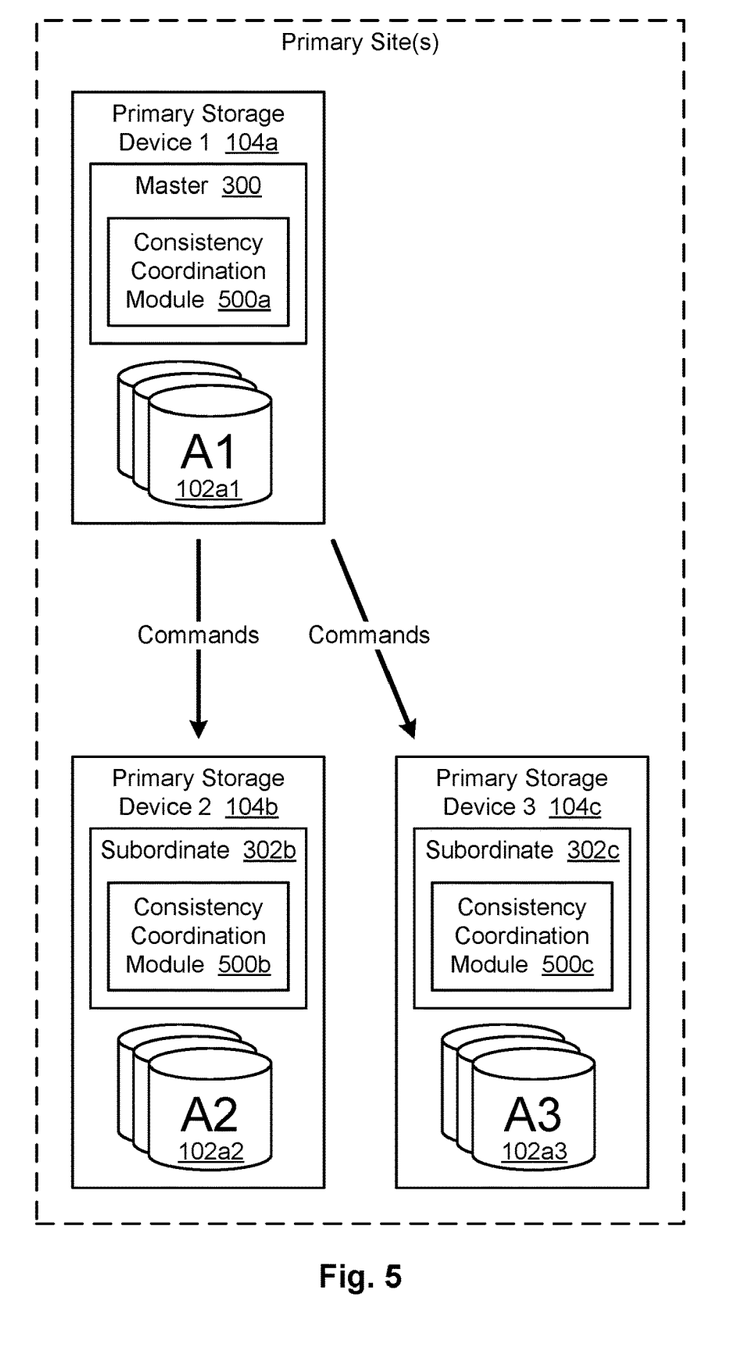
FIG. 5 is a high-level block diagram showing consistency coordination modules in each of the primary storage devices.

Referring to FIG. 5, in certain embodiments in accordance with the invention, each primary storage device 104a-c may be configured with a consistency coordination module 500 to reduce coordination times in an asynchronous data replication environment 100. In general, the consistency coordination modules 500a-c may contain functionality to compensate for differing distances between the primary storage devices 104a-c. More specifically, the consistency coordination modules 500a-c may contain functionality to enable the primary storage devices 104a-c to execute a Start Increment (or equivalent) command at substantially the same time, thereby synchronizing as much as possible the queuing of host I/O. Ideally, this will reduce the amount of time that host I/O is interrupted. This may occur regardless of when the primary storage devices 104a-c receive the Start Increment command.

In order to accomplish the above-described benefits, the consistency coordination modules 500a-c may determine network latency between the master primary storage device 104a and the subordinate primary storage devices 104b, 104c (the master primary storage device 104a may also function as a subordinate primary storage device 104a in that it responds to commands from the master 300). Each consistency coordination module 500 may also determine how long it takes for the corresponding primary storage device 104 to process a Start Increment command (a primary storage device 104 that is busy or has lower performance characteristics may take longer to process a Start Increment command than a primary storage device 104 that is not busy or has higher performance characteristics). Using the network latency and performance information, each consistency coordination module 500 may calculate an amount of time to hold a received Start Increment command before executing it. By holding the Start Increment command for the calculated amount of time, each primary storage device 104 may execute the Start Increment command at substantially the same time, thereby more closely synchronizing the queuing of host I/O and reducing the amount of time that host I/O is interrupted.

Figure 6:
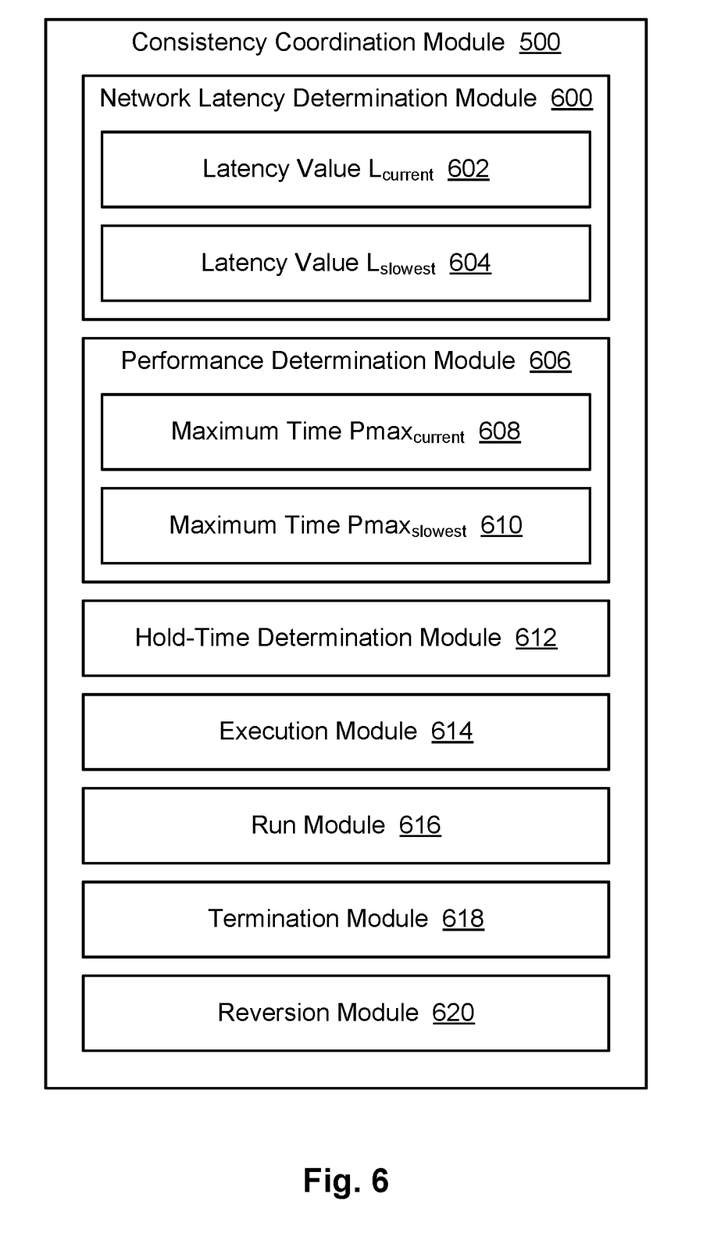
FIG. 6 is a high-level block diagram showing various sub-modules that may be included within a consistency coordination module.

Referring to FIG. 6, the consistency coordination modules 500a-c illustrated in FIG. 5 may include various sub-modules to provide various features and functions. These sub-modules, like the consistency coordination modules 500a-c themselves, may be implemented in hardware, software, firmware or combinations thereof. The sub-modules are presented by way of example and not limitation. The consistency coordination modules 500a-c may, in certain embodiments, include more or fewer sub-modules than those illustrated. Similarly, the functionality of the sub-modules may, in certain embodiments, be combined into a single or smaller number of sub-modules or the functionality of a single sub-module may be distributed across several sub-modules. The illustrated sub-modules are not necessarily located in all consistency coordination modules 500a-c and may, in certain embodiments, be implemented as separate modules or in different locations than the consistency coordination modules 500a-c.

As shown, a consistency coordination module 500 may include one or more of a network latency determination module 600, performance determination module 606, hold-time determination module 612, execution module 614, run module 616, termination module 618, and reversion module 620.

The network latency determination module 600 is configured to determine network latency ($L_{current}$) between a master 300 and a particular subordinate primary storage device 104. This network latency may be expressed as a latency value 602 ($L_{current}$). The network latency determination module 600 may also be configured to determine the primary storage device 104 having the greatest network latency relative to the master 300. This network latency may be expressed as a latency value 604 ($L_{slowest}$). In certain embodiments, the consistency coordination module 500 associated with the master 300 may gather or record network latency values from each of the subordinate primary storage devices 104b, 104c and provide these network latency values to the consistency coordination modules 500a-c of the various primary storage devices 104a-c. In certain embodiments, the network latency value 602 for the master primary storage device 104a (which also acts as a subordinate) is zero.

The performance determination module 606 is configured to determine the performance of a primary storage device 104. This may be accomplished by measuring a maximum time taken by a primary storage device 104 to process a Start Increment command. This time may be expressed as a maximum time 608 ($Pmax_{current}$) for the primary storage device 104 and may be updated anytime a Start Increment command takes longer than $Pmax_{current}$ to execute. The performance determination module 606 may also determine a maximum time 610 ($Pmax_{slowest}$) associated with a slowest-performing primary storage device 104 (i.e., the primary storage device 104 taking the longest to process a Start Increment command). In certain embodiments, the consistency coordination module 500 associated with the master 300 may gather or record performance values 608, 610 for each of the primary storage devices and provide these values 608, 610 to the consistency coordination modules 500 of the primary storage devices 104.

Using the values 602, 604, 608, 610, the hold-time determination module 612 may calculate how long a primary storage device 104 should hold a Start Increment command before executing it. Each subordinate 302 (including the subordinate internal to the master 300) may perform this calculation to determine how long to hold the command. In certain embodiments, the hold time may be calculated as follows:

$$\text{hold time} = 2*L_{slowest} + P\max_{slowest} - P\max_{current} - L_{current}$$

Once a subordinate 302 has held the Start Increment command for the calculated amount of time, the execution module 614 may execute the Start Increment command and begin to queue host I/O. In certain embodiments, this may include returning an acknowledgement to the master 300 indicating that the subordinate 302 is queuing host I/O.

Once a subordinate 302 is queuing host I/O and has returned an acknowledgement to the master 300, the master 300 may form the consistency group. The master 300 may then send a Run command to the subordinate primary storage devices 104 to instruct them to resume processing host I/O. The run module 616 may receive this Run command and cause the corresponding subordinate primary storage device 104 to resume processing host I/O.

In other embodiments, each subordinate primary storage device 104 may resume processing host I/O on its own without receiving a Run command. This, may occur, for example, after the subordinate primary storage device 104 has queued host I/O for some amount of time. The amount of time may be based on the time needed for the formation of a consistency group plus potentially some buffer to compensate for variations in the times that subordinate primary storage devices 104 begin queuing host I/O. In such embodiments, the master 300 may cease to issue Run commands to the various subordinate primary storage devices 104 after formation of a consistency group, thereby allowing the subordinate primary storage devices 104 to resume host I/O processing on their own.

In certain embodiments, a master 300 may observe network latency or performance for a particular subordinate primary storage device 104 that is significantly longer or slower than what is expected from the values 602, 604, 608, 610, which have been established by previous observations/measurements. For example, a master 300 may observe increased network latency when receiving an acknowledgement sent in response to a Start Increment command. If actual network latency or performance deviates significantly from what is expected, the termination module 618 may cause the master 300 to fail the consistency group and the values 602, 604, 608, 610 may be adjusted to conform to the observed network latency and/or performance. The master 300 may then retry the consistency group by sending Start Increment commands to the subordinate primary storage devices 104. If a consistency group continues to fail, the reversion module 620 may cause the primary storage devices 104*a-c* to revert to a conventional technique for coordinating consistency groups.

Figure 7:
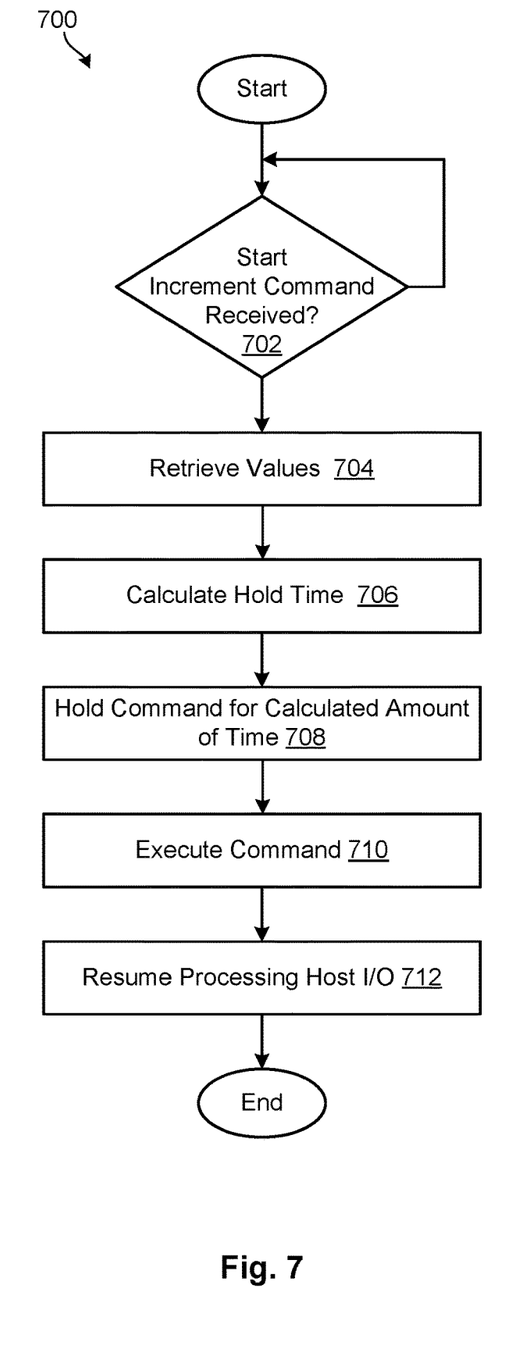
FIG. 7 is a flow diagram showing one embodiment of a method for reducing consistency group coordination times.

Referring to FIG. 7, one embodiment of a method 700 for reducing consistency group coordination times is illustrated. The illustrated method 700 may, in certain embodiments, be executed by a subordinate primary storage device 104. As shown, the method 700 initially determines 702 whether a Start Increment command has been received from a master 300. If so, the method 700 retrieves 704 the values 602, 604, 608, 610 (network latency values, performance values) previously discussed. These values 602, 604, 608, 610 may be calculated by the subordinate primary storage device 104 itself, or be received from the master primary storage device 104*a*. In certain embodiments, the method 700 returns, to the master 300, an acknowledgement that the Start Increment command was received at step 702.

Using the values 602, 604, 608, 610 retrieved at step 704, the method 700 calculates 706 an amount of time to hold the Start Increment command. The method 700 then holds 708 the Start Increment command the calculated amount of time, after which the method 700 executes 710 the Start Increment command by queuing host I/O. After queuing host I/O for a certain amount of time or after receiving a Run command from the master 300, the method 700 resumes 712 processing host I/O.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for synchronizing primary storage devices in an asynchronous data replication environment, the method comprising:
   transmitting, from a master primary storage device to each of a plurality of subordinate primary storage devices, a command to begin queuing I/O received from a host system;
   receiving the command by each of the subordinate primary storage devices;
   calculating, for each of the subordinate primary storage devices, an amount of time to wait before executing the command in order to synchronize the queuing of I/O by the subordinate primary storage devices; and
   executing, by each of the subordinate primary storage devices, the command after waiting its corresponding amount of time.

2. The method of claim 1, wherein the amount of time is based at least partly on network latency between the master primary storage device and the subordinate primary storage device receiving the command.

3. The method of claim 1, further comprising returning, from each subordinate primary storage device to the master primary storage device, an acknowledgement indicating that the subordinate primary storage device is queuing I/O from the host system.

4. The method of claim 3, further comprising forming, by the master primary storage device, a consistency group upon receiving the acknowledgment.

5. The method of claim 2, wherein the network latency depends on a network path length between the master primary storage device and the subordinate primary storage device receiving the command.

6. The method of claim 1, wherein the amount of time is based at least partly on performance of a subordinate primary storage device receiving the command.

7. The method of claim 1, further comprising repeatedly recalculating the amount of time.

8. A computer program product for synchronizing primary storage devices in an asynchronous data replication environment, the computer program product comprising a non-transitory computer-readable storage medium having computer-usable program code embodied therein, the computer-usable program code configured to perform the following:
transmit, from a master primary storage device to each of a plurality of subordinate primary storage devices, a command to begin queuing I/O received from a host system;
receive the command by each of the subordinate primary storage devices;
calculate, for each of the subordinate primary storage devices, an amount of time to wait before executing the command in order to synchronize the queuing of I/O by the subordinate primary storage devices; and
execute, by each of the subordinate primary storage devices, the command after waiting its corresponding amount of time.

9. The computer program product of claim 8, wherein the amount of time is based at least partly on network latency between the master primary storage device and the subordinate primary storage device receiving the command.

10. The computer program product of claim 8, wherein the computer-usable program code is further configured to return, from each subordinate primary storage device to the master primary storage device, an acknowledgement indicating that the subordinate primary storage device is queuing I/O from the host system.

11. The computer program product of claim 10, wherein the computer-usable program code is further configured to form a consistency group when the master primary storage device receives the acknowledgment.

12. The computer program product of claim 9, wherein the network latency depends on a network path length between the master primary storage device and the subordinate primary storage device receiving the command.

13. The computer program product of claim 8, wherein the amount of time is based at least partly on performance of a subordinate primary storage device receiving the command.

14. The computer program product of claim 8, wherein the computer-usable program code is further configured to repeatedly recalculate the amount of time.

15. A system for synchronizing primary storage devices in an asynchronous data replication environment, the system comprising:
an asynchronous data replication environment comprising a master primary storage device and a plurality of subordinate primary storage devices, the asynchronous data replication environment configured to:
transmit, from a master primary storage device to each of a plurality of subordinate primary storage devices, a command to begin queuing I/O received from a host system;
receive the command by each of the subordinate primary storage devices;
calculate, for each of the subordinate primary storage devices, an amount of time to wait before executing the command in order to synchronize the queuing of I/O by the subordinate primary storage devices; and
execute, by each of the subordinate primary storage devices, the command after waiting its corresponding amount of time.

16. The system of claim 15, wherein the amount of time is based at least partly on network latency between the master primary storage device and the subordinate primary storage device receiving the command.

17. The system of claim 15, wherein the asynchronous data replication environment is further configured to return, from each subordinate primary storage device to the master primary storage device, an acknowledgement indicating that the subordinate primary storage device is queuing I/O from the host system.

18. The system of claim 17, wherein the asynchronous data replication environment is further configured to form a consistency group when the master primary storage device receives the acknowledgment.

19. The system of claim 16, wherein the network latency depends on a network path length between the master primary storage device and the subordinate primary storage device receiving the command.

20. The system of claim 15, wherein the amount of time is based at least partly on performance of a subordinate primary storage device receiving the command.

* * * * *